United States Patent [19]

Ono

[11] Patent Number: 5,222,033
[45] Date of Patent: Jun. 22, 1993

[54] METHOD OF RETRIEVING FRAMES ON A MICROFICHE USING ARBITRARILY DESIGNATED FRAMES

[75] Inventor: Masaru Ono, Tokyo, Japan

[73] Assignee: Fuji Photo Film Co., Ltd., Kanagawa, Japan

[21] Appl. No.: 873,612

[22] Filed: Apr. 17, 1992

Related U.S. Application Data

[63] Continuation of Ser. No. 471,691, Jan. 29, 1990, abandoned, which is a continuation of Ser. No. 164,168, Mar. 4, 1988, abandoned.

[30] Foreign Application Priority Data

Mar. 6, 1987 [JP] Japan ................. 62-51285

[51] Int. Cl.⁵ ............................................. G06F 15/40
[52] U.S. Cl. ........................ 364/525; 364/571.02; 353/27 A; 356/150; 355/53
[58] Field of Search ........... 364/525, 571.02, 571.04; 353/27 A, 27 R; 356/150, 138, 399; 355/53

[56] References Cited

U.S. PATENT DOCUMENTS

| | | | |
|---|---|---|---|
| 3,832,528 | 8/1974 | Abe | 353/27 A |
| 3,841,747 | 10/1974 | Peroutky et al. | 353/27 A |
| 4,179,743 | 12/1979 | Suzuki et al. | 364/900 |
| 4,190,899 | 2/1980 | Smith et al. | 364/900 |
| 4,287,564 | 9/1981 | Swift et al. | 364/525 |
| 4,427,292 | 1/1984 | Buchanan | 364/525 |
| 4,515,451 | 5/1985 | Benham, Jr. et al. | 353/27 R |
| 4,549,797 | 10/1985 | Sawano et al. | 353/27 A |

*Primary Examiner*—Vicent N. Trans
*Attorney, Agent, or Firm*—Sughrue, Mion, Zinn, Macpeak & Seas

[57] ABSTRACT

When a microfiche is automatically retrieved by a microfiche retrieval device, and the data of a target frame is input from the keyboard, the microfiche is conveyed to automatically retrieve the frame at the position relevant to the input data, and the largest frame is projected on a reader screen. The positional data for retrieving frames corresponding to the frame addresses other than that of the target frame and the fiche-mode data necessary for retrieving and outputting the imaged frames is stored in memory prior to retrieval of a frame. The stored data is read out so that the correct frame can be retrieved. Even if frames are not positionally aligned with the feeding direction of a particular microfiche or even if the reference frame or the maximum address frame is not exposed on a microfiche, frames can automatically be positioned at a high speed simply by designating a plurality arbitrary frames which are actually exposed with images.

14 Claims, 6 Drawing Sheets

METHOD OF RETRIEVING FRAMES ON A MICROFICHE USING ARBITRARILY DESIGNATED FRAMES

This is a Continuation of application Ser. No. 07/471,691 filed Jan. 29, 1990 which is a Continuation of application Ser. No. 07/164,168 filed Mar. 4, 1988 now abandoned.

BACKGROUND OF THE INVENTION

This invention relates to an automatic retrieval method in a microfiche retrieval device.

As is well-known, when automatically retrieving a frame recorded on a microfiche with a microfiche retrieval device, a target frame is automatically positioned by inputting the address (expressed by the numbers of frames rom the reference frame in row and column) of the frame from a keyboard of the retrieval device to make the retrieval device convey the microfiche and to detect a frame corresponding to the input address so as to be able to project the target frame on a reader screen.

Figure 1:
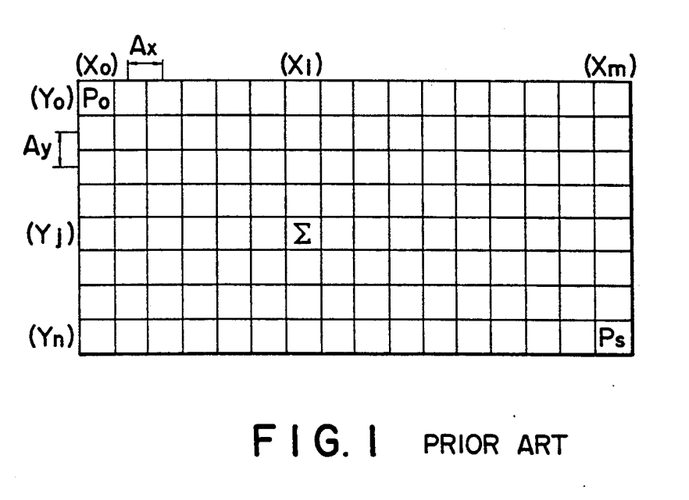
FIGS. 1 and 2 are explanatory views of prior art frame positioning methods, respectively.

FIG. 1 graphically shows an example of a frame arrangement of a microfiche which has hitherto been used. On this microfiche are recorded (m+1) frames along the horizontal (row) direction Z and (n+1) frames along the vertical (column) direction Y from a "reference frame" $P_O$ (its address being (O,O)) which is the first address at the top left corner to a "span frame" $P_2$ (its address being (m,n)) which is the largest address at the right bottom corner in the figure. The frame pitch between adjacent frames is known since it has been set when photographed. The value is $A_x$ in the direction of the X axis and $A_y$ in the direction of the Y axis. The value is presumed to be manually input into the microfiche retrieval device in advance.

Conventionally, the reference frame $P_O$ which is the reference point for positioning frames is first set at the position of projection of the retrieval device. The retrieval device measures the distance from the mechanical origin (not shown) thereof by the amount of displacement (for example, the number of pulses) when the microfiche is conveyed and calculates the position of the reference frame $P_O$ in terms of coordinate value $(X_O, Y_O)$. When the address of the frame to be retrieved, for example, address (i,j) of the frame "$\Sigma$" is input, the coordinate value $(X_i, Y_j)$ of the frame "$\Sigma$" is calculated from the following formula (1) using the coordinate value $(X_O, Y_O)$ of the reference frame $P_O$ and the reference pitches $A_x$ and $A_y$.

$$\left. \begin{array}{c} X_i = X_o + i \cdot A_x \\ Y_j = Y_o + j \cdot A_y \end{array} \right\} \quad (1)$$

Such positioning method is only applicable to a microfiche whose frames are arranged in parallel with the X-Y moving directions of the retrieval device. In practice, however, the arrangement of frames is not necessarily in parallel with the moving axes of the retrieval device due to deviation and so on of the film from the set position when photographed. This brings up a problem that even if the above mentioned positioning is carried out, the object frame cannot be accurately positioned on the reader screen and the position has to be further adjusted manually each time.

Figure 2:
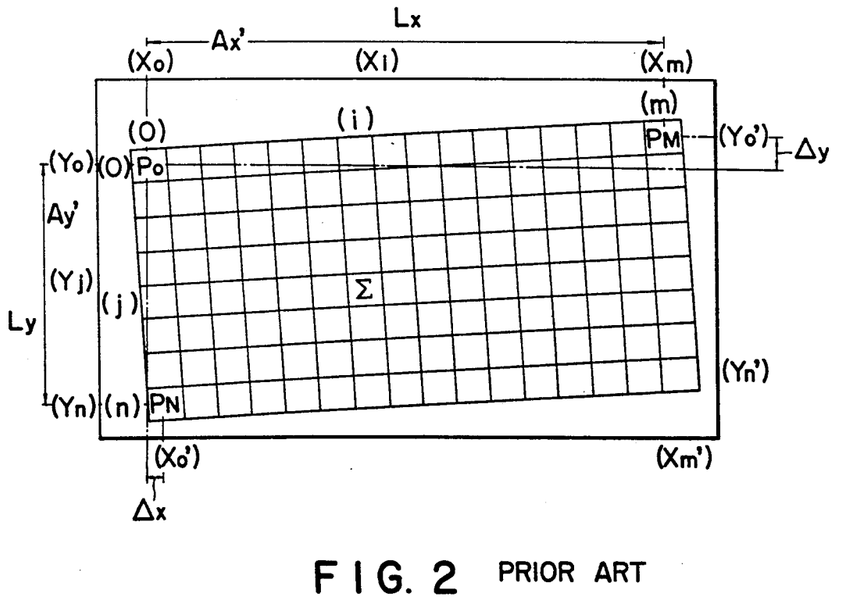

A method for positioning a frame which solves such problems is disclosed in the specification of U.S. Pat. No. 4,287,564. According to the disclosed method, as shown in FIG. 2 which corresponds to FIG. 1, the arrangement of frames slants against the axes (X and Y axes) of the retrieval device. It is assumed that the number {(m+1)×(n+1) of frames is known. As explained above, the position of the reference frame $P_O$ is measured in terms of the coordinates $(X_O, Y_O)$ while the position of the frame $P_M$ which has the maximum address along the same row as the reference frame $P_O$ (the address thereof being (m,O)) is measured in terms of coordinate values $(X_m, Y_o')$. The displacement $L_x$ therebetween is the direction of the X axis and the deviation $\Delta_y$ in the direction of the Y axis due to skew are calculated from the coordinate values using the following formula (2).

$$\left. \begin{array}{c} L_x = X_m - X_o \\ \Delta_y = Y_o' - Y_o \end{array} \right\} \quad (2)$$

Using the displacement $L_x$, the deviation $\Delta_y$ in the direction of the Y axis and the number m of frames therebetween, the reference pitch $A_x'$ and a reference correction $\delta_y$ per frame are obtained from the following formula (3).

$$\left. \begin{array}{c} A_x' = L_x/m \\ \delta_y = \Delta_y/m \end{array} \right\} \quad (3)$$

Similarly, the position of a frame $P_N$ (its address being (O,n)) which has the maximum address in the same column as the reference frame $P_O$ is measured in terms of coordinate value $(X_O', Y_n)$. The displacement $L_y$ therebetween along the direction of the Y axis and the deviation $\Delta_x$ in the direction of the X axis due to skew are calculated from the coordinate values using the following formula (4).

$$\left. \begin{array}{c} L_y = Y_n - Y_o \\ \Delta_x = X_o' - X_o \end{array} \right\} \quad (4)$$

Using the displacement $L_y$, the deviation $\Delta_x$ along the X axis and the number n of frames therebetween, the reference pitch $A_y'$ and the reference correction $\delta_x$ per frame are calculated from the following formula (5).

$$\left. \begin{array}{c} A_y' = L_y/n \\ \delta_x = \Delta_x/n \end{array} \right\} \quad (5)$$

The reference correction $\delta_x$ along the direction of the X axis is the amount of deviation between frames along the same row (the first row in this example) while the reference correction $\delta_6$ along the direction of the Y axis is the amount of deviation between frames in the same column (the first column in this example). Thus, the reference correction $\delta_y$ in the direction of the Y axis is accumulated at the row address while the reference correction $\delta_x$ in the direction of the X axis at the column address, both of which increase respectively.

If the frame address of a frame to be retrieved, the frame address (i,j) of a frame "Σ" as shown in FIG. 2 for example, is input, the coordinate value $X_iY_j$) of the frame Σ can be calculated using the coordinate values $(X_O,Y_O)$ of the reference frame $P_O$ and the reference pitches $A_x'$ and $A_y'$ obtained from the above mentioned formulas (3) and (5) and reference corrections $\delta_x$ and $\delta_y$ by the following formula (6).

$$\left.\begin{aligned}X_i &= X_o + i \cdot A_x' + j \cdot \delta_x \\ &= X_o + i \cdot \frac{X_m - X_o}{m} + j \cdot \frac{X_o' - X_o}{n} \\ Y_j &= Y_o + j \cdot A_y' - i \cdot \delta_y \\ &= Y_o + j \cdot \frac{Y_n - Y_o}{n} - i \cdot \frac{Y_o' - Y_o}{m}\end{aligned}\right\} \quad (6)$$

According to the method for positioning a frame, as explained above, the maximum frame distances $L_x$ and $L_y$ in both the row and the column of the microfiche are measured, which are then respectively divided by the numbers m and n of frames therebetween to obtain the reference pitches $A_x'$ and $A_y'$. At the same time, the reference corrections $\delta_x$ and $\delta_y$ are obtained from the deviations $\Delta_x$ and $\Delta_y$ caused by slanting and corrections are made to the above reference pitches $A_x'$ and $A_y'$. Even if the frame images are slanted on a microfiche, the skew is corrected to position the object frame accurately.

In such a method for positioning a frame, the reference frame $P_O$ and the maximum address frames $P_M$ and $P_N$ of the row and the column have to be photographed. Furthermore, such frame images have to be very clear as they play the role of the reference. With some microfiches, however, only a letter for an index is recorded in the reference frame $P_O$, for example, or recorded on the maximum address frames $P_M$ and $P_N$ for the convenience of editing. The prior art method for positioning a frame as explained above was not applicable to such microfiches.

Moreover, when a frame of a microfiche was to be retrieved using the positioning of the prior art method described above, the data for positional adjustment could only be obtained for the frames mentioned above, and the fiche-mode data for respective frames had to be input manually depending on the particular microfiche in use. Therefore, the prior art method is incapable of automatically conducting precise retrieval at a high speed.

SUMMARY OF THE INVENTION

This invention was contrived to obviate aforementioned defects encountered in the prior art, and aims to provide an automatic retrieval method of the type of microfiche where frames are not aligned in arrangement with the feeding direction of the retrieval device and where the reference frame or the maximum address frame in the row of column of the reference frame is not exposed thereon, which can automatically and precisely position ion a relevant frame at a high speed simply by the steps of storing positional data for retrieving frames corresponding to the frame addressed other than the maximum address and the fiche-mode data necessary for retrieving and outputting imaged frames, describing arbitrary and plural frames which are actually exposed wit images, and, at the time of retrieval, reading out the stored data.

According to one aspect of this invention, for achieving the objects described above, there is provided an automatic retrieval method comprising the steps of arbitrarily designating a plurality of frames of different addresses which are exposed on a microfiche, calculating positioning data for positioning an arbitrary frame based on the addresses and the coordinates of said plural frames on a retrieval device, storing the calculated data and fiche-mode data in a memory, and reading said registered stored data when said microfiche is to be used to thereby correctly position relevant frames for automatic retrieval.

The nature, principle and utility of the invention will become more apparent from the following detailed description when read in conjunction with the accompanying drawings.

DETAILED DESCRIPTION OF THE INVENTION

Figure 3:
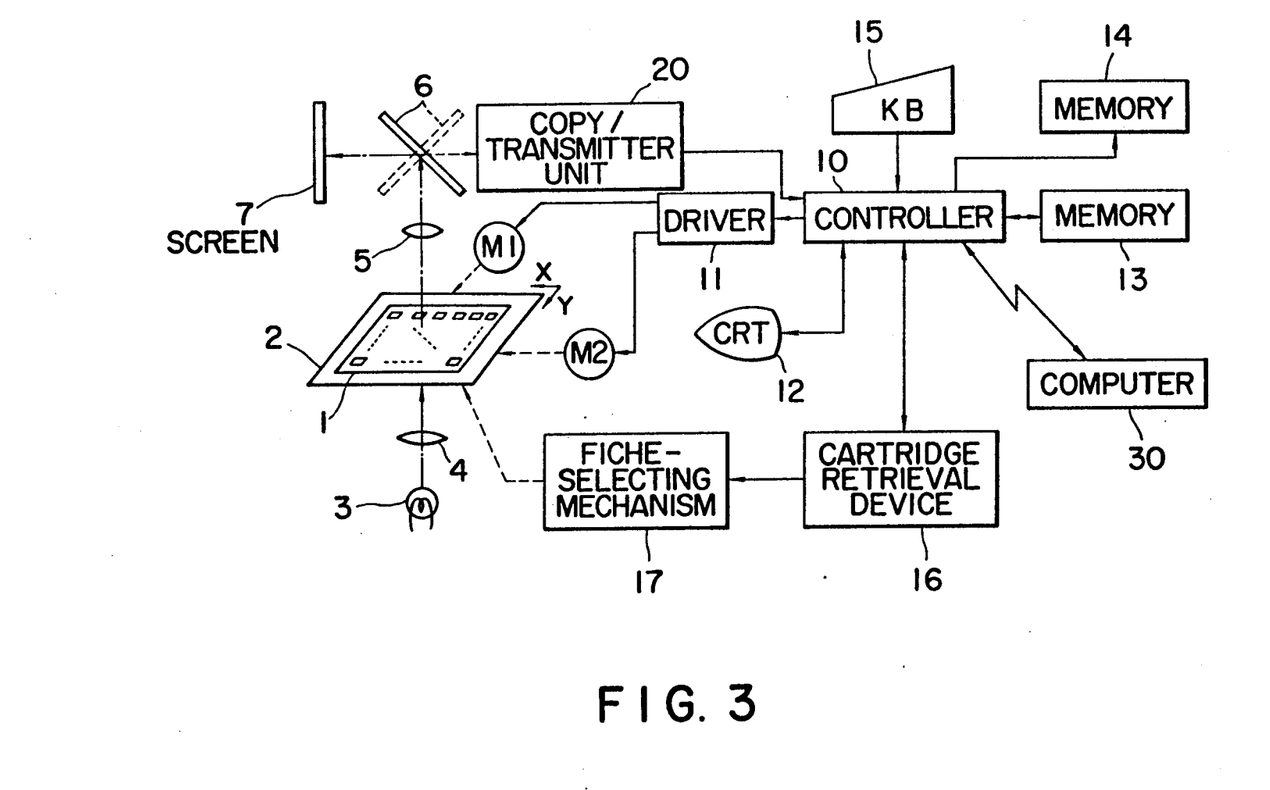
FIG. 3 is a block diagram showing an embodiment of the microfilm retrieval device related to the method of the present invention.

FIG. 3 shows an embodiment of a microfilm retrieval device to which the method of the present invention is applied wherein a selected microfiche 1 is placed on a retrieval table 2, and exposed to the light coming from a light source 3 via a lens system 4. The light transmitted through a target frame on the microfiche 1 is input into a mirror 6 via a lens system 5. The images on the frame are operatively projected on a screen 7 with the light reflected from the mirror 6, or transmitted to a controller 10 via a copy/transmitter unit 20. The retrieval device as a whole is controlled by the controller 10 which comprises a CPU and other devices, and the controller 10 is connected to an outside computer 30. The retrieval table 2 is adjustable in position as it is moved in the directions of the X and Y axes with pulse motors M1 and M2 via a driver 11. The microfiche 1 is selected by a fiche-selecting mechanism 17 via a cartridge retrieval device 16. A keyboard 15 is connected to the controller 10 for data input and operational instruction. Factors necessary for retrieval are displayed on a CRT 12. The controller 10 is connected to a memory 13, and a memory 14. Memory 14 records and registers on a microfiche 1 or a cartridge positional data for positional adjustment of imaged frames, a format number which identifies the format of the microfiche 1, feeding direction data which indicates the direction of retrieval in terms of the X or Y axis, magnification of lenses which indicates the magnification of images for output of records, security data which instructs confidential data or prohibition of outputs, rotation correction which indicates the correction values for the deviation of images on the screen 7, positional data of an index frame which records the index of each frame on the microfiche, 1, and fiche-mode data necessary for output in addressing mode.

Figure 4:
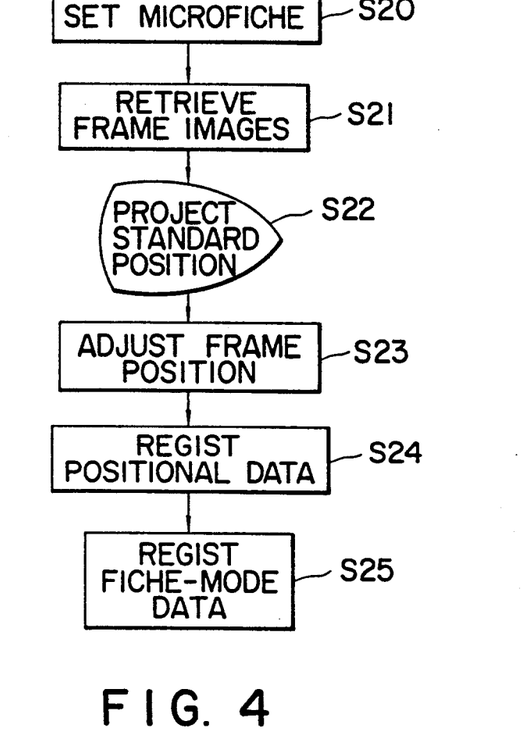
FIG. 4 is a flow chart showing an example of data registration sequence according to the method of the present invention.
Figure 5:
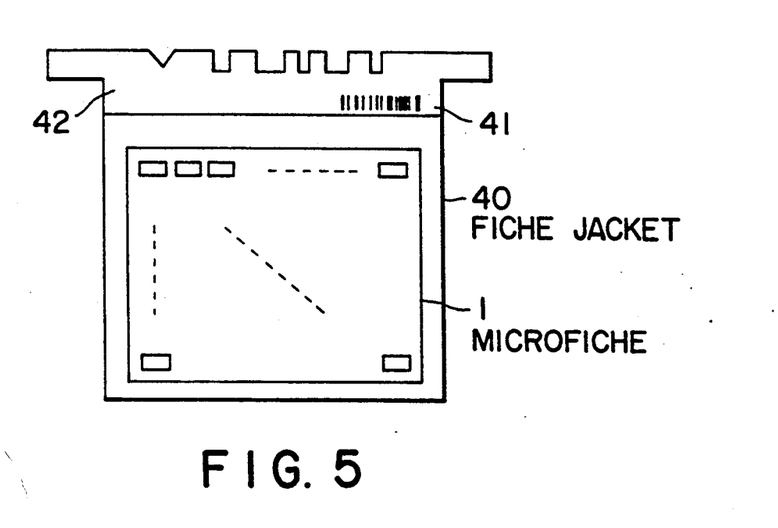
FIGS. 5 and 6 are views showing an embodiment of data registration according to the method of the present invention, respectively.
Figure 6:
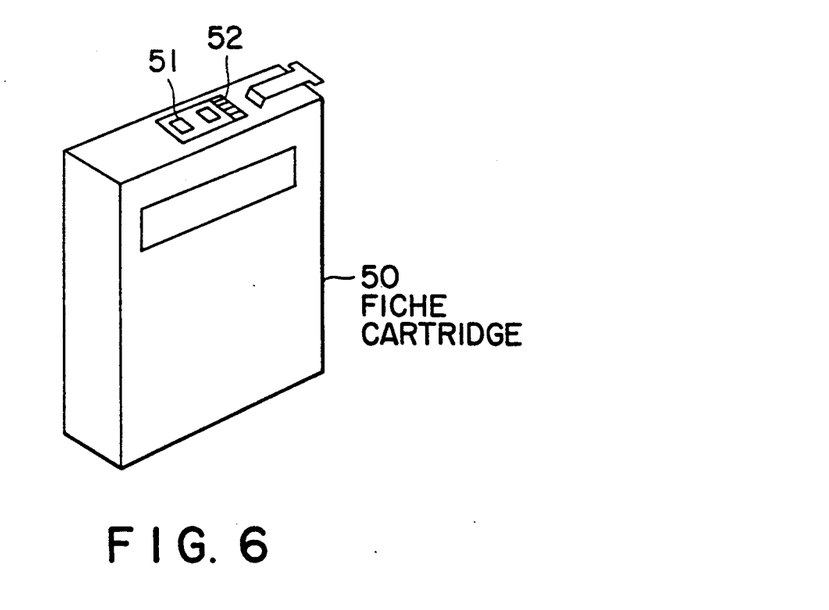

When data is to be registered in the retrieval device having the aforementioned structure, as shown in FIG. 4, a microfiche is selected consectively by the fiche-selecting mechanism 17, and placed on the retrieval table 2 (Step S20), and the pulse motors M1 and M2 are operatively actuated to retrieve frame images (Step S21). Then, the frames are positioned at the standard position where the frame images come to the center of a frame, and the frame images are projected (Step S22). The frame adjustment conducted as set forth above is calculated in terms of amount (e.g. pulse number) from the driving of the pulse motors M1 and M2 (Step S23), and the data for positional correction is registered for each microfiche (Step S24). Then such fiche-mode data as the format number indicating the type of the microfiche 1, the feeding direction indicating the horizontal and vertical directions of retrieval within the microfiche 1, the lens magnification indicating the degree of enlargement/reduction, security data for confidential data or output prohibition, etc. are registered for each frame (Step S25). The positional correction data or the fiche-mode data are registered as shown in FIG. 5 by printing bar-codes 41 (or magnetic ink code, OCR, characters, etc.) on a code board 42 of a fiche jacket 40 which houses microfiche 1, or are stored via a terminal 52 on a memory element 51 (EEPROM, EPROM, IC card, etc.) provided on a fiche cartridge 50 which houses a large number of microfiches as shown in FIG. 6. The memory 13 may be a non-volatile type RAM or a ROM. The data may be registered in an auxiliary memory device 14 such as floppy discs, hard discs, bubble-memories or a retrieval data base of the outside computer 30.

Figure 7:
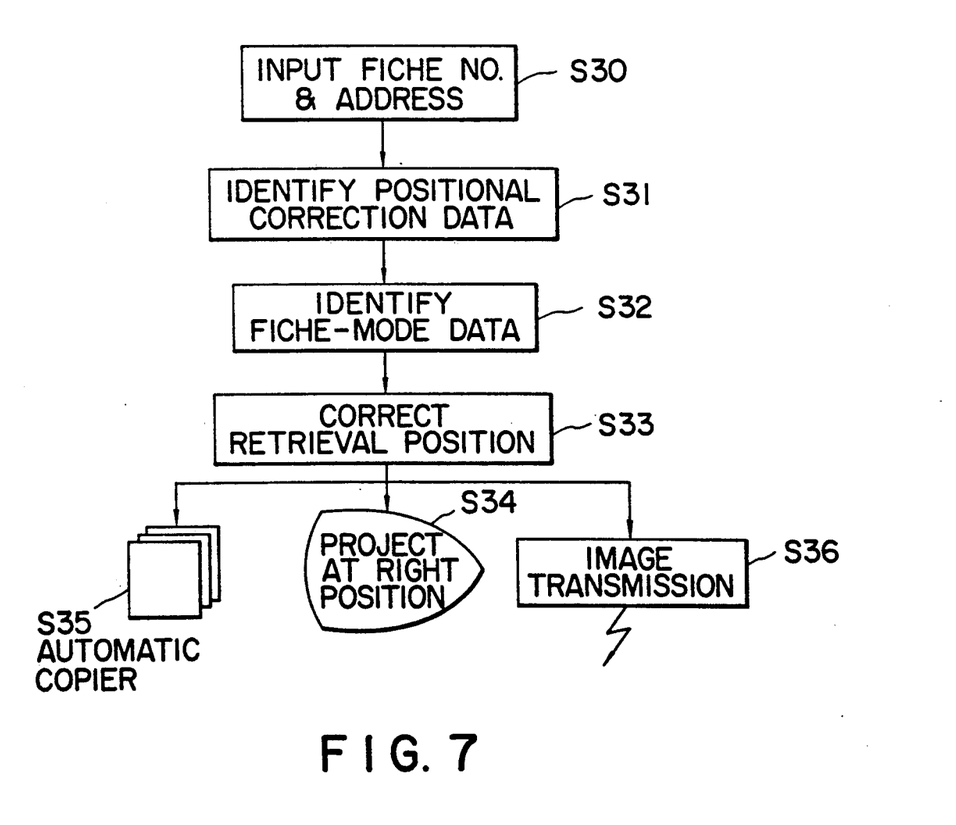
FIG. 7 is a flow chart showing an example of the sequence of the retrieval of the present invention.

If the positional correction data and the fiche-mode data are obtained and registered in advance for each microfiche, correct positional adjustment for retrieval, copy or transmission becomes possible simply by reading out the data corresponding to a particular frame member at the time of retrieval. FIG. 7 shows an example of such operations. By inputting the fiche number and frame address from the keyboard 15 (Step S30), the microfiches of which number was input by the fiche-selecting mechanism 17 is selected form a cartridge, set, and positioned at a retrieval position by driving the pulse motors M1 and M2 via the driver 11. The positional correction data and the fiche-mode data are read out to identify the mode and to judge the necessity of correction and if judged necessary, the position is corrected by driving the pulse motors M1 and M2 (Steps S31, S32 and S33), so that it may be projected at the right position (Step S34), or if necessary, transmitted to an automatic copier or other apparatuses by using a copy unit or a transmitter unit (Steps S35 and S36).

The method to adjust the frame position or the method to calculate the positional correction data will be described below.

Figure 8:
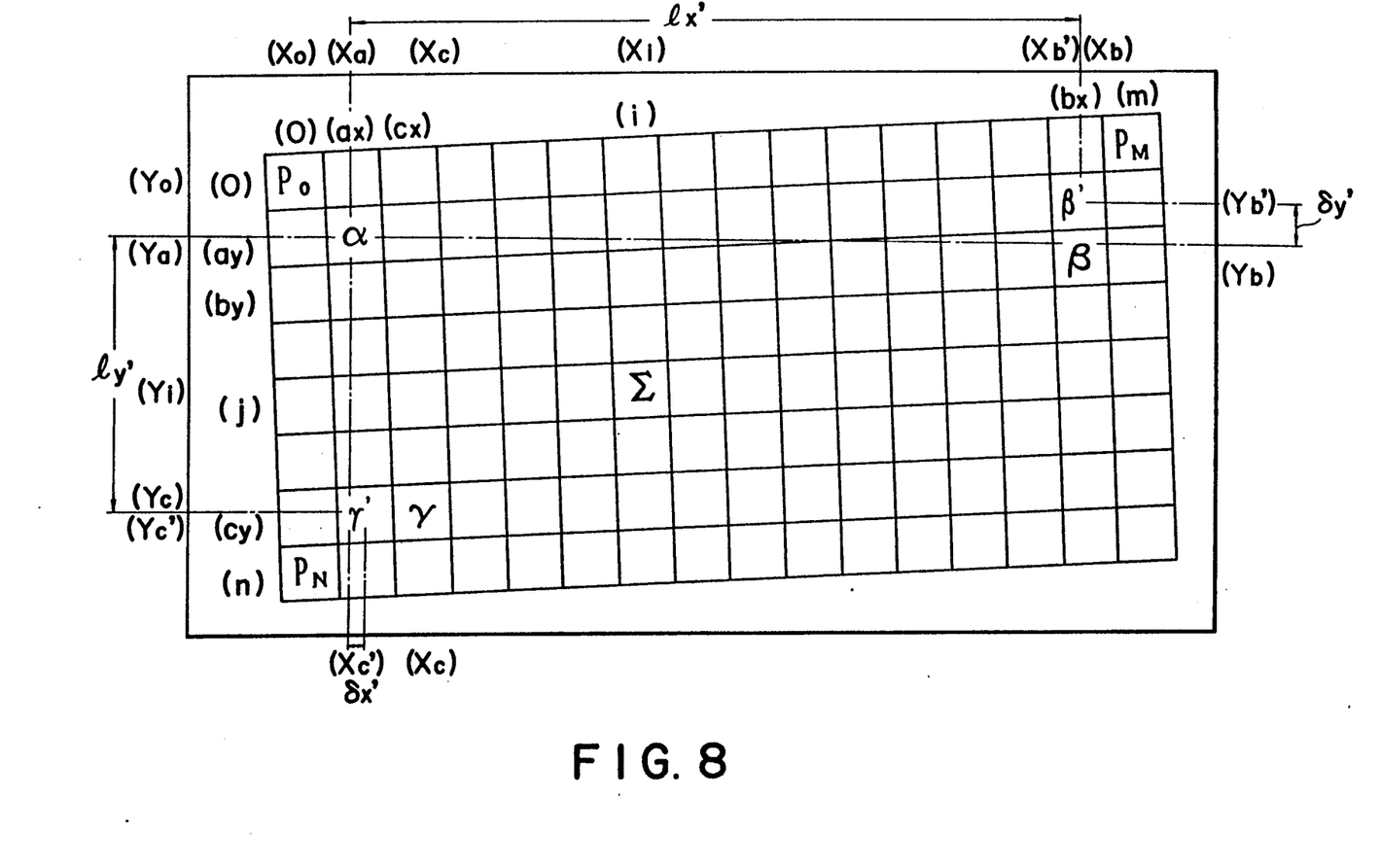
FIG. 8 is a chart explaining the positioning method according to the present invention.

FIG. 8 is a chart explaining a method for positioning a frame according to the present invention method. In FIG. 8, when images are not recorded in the frame $P_O$ which is the "reference frame" and the maximum address frames $P_M$ and $P_N$ in the first row and the first column, respectively, and the method for positioning a frame is not applicable, the mode of the microfiche retrieval device is changed to a "Frame Adjustment Mode" and the three frames described above which have recorded images are designated. By accurately positioning these three frames, the coordinate value of the reference frame, the reference pitch and the reference correction are obtained, thus realizing positioning of an arbitrary frame the address of which is input. Though these three frames may be arbitrarily selected, it is preferable to designate the frames located as far apart as possible from each other in X-Y directions respectively due to the reason explained hereinafter in order to accurately position the frame to be retrieved. This example uses the first frame "α" which is closest to the reference frame $P_O$ and is recorded with images, the second frame "β" which is closest to the maximum address frame $P_M$ along the row and is recorded with images, and the third frame "γ" which is closest to the maximum address frame along the column $P_N$ and is recorded with images.

Figure 9:
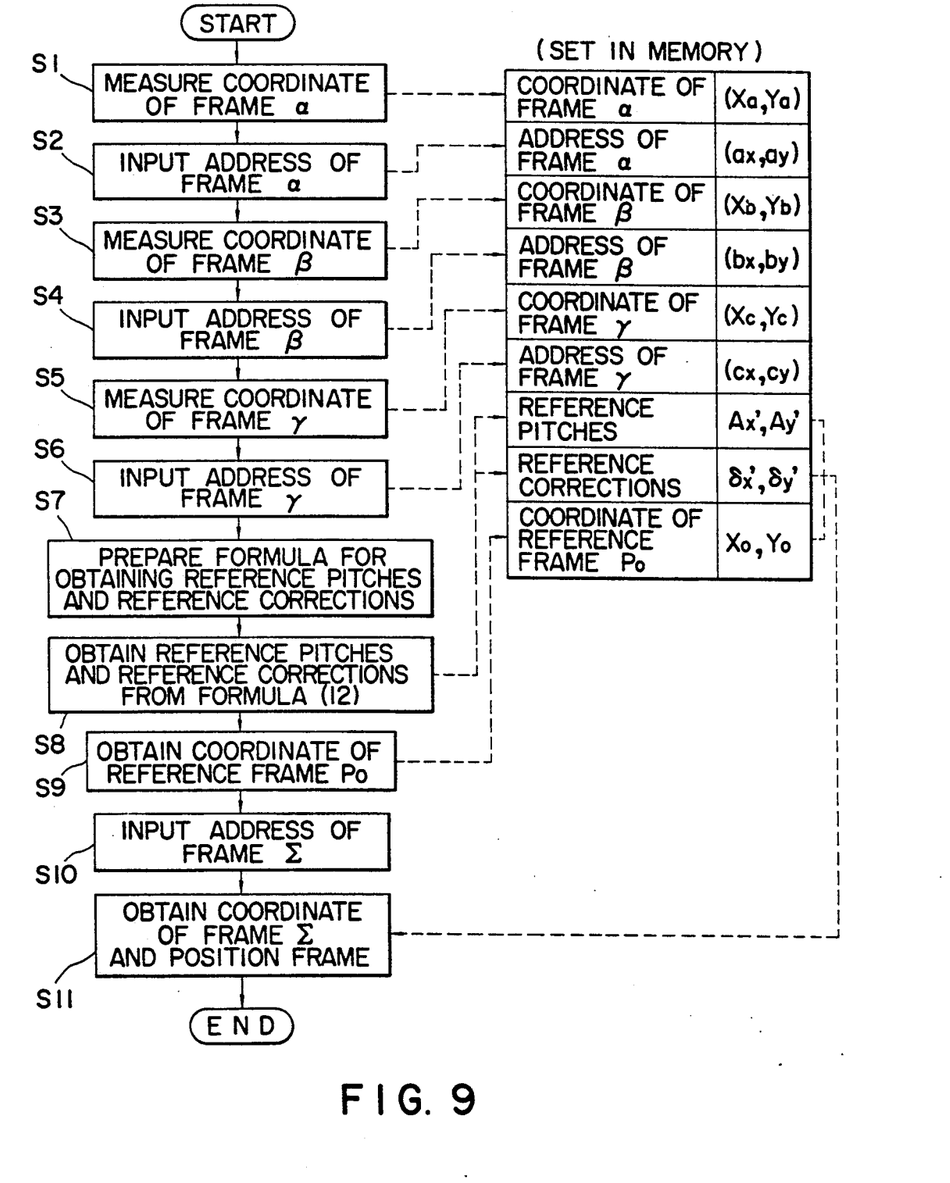
FIG. 9 is a flow chart showing the operation thereof.

FIG. 9 is a flow chart showing the operation of the method for positioning a frame. The method will now be described referring to the chart.

When a frame "Σ" as shown in FIG. 8 is to be retrieved, the retrieval device is switched to "Frame Pitch Adjustment Mode" and the operation of positioning a frame starts. The first frame α (the address thereof being $(a_x,a_y)$) and the second frame β (the address thereof being $(b_x,b_y)$) are designated. Then the first frame α is projected and accurately positioned at the center of the screen 7 using the "Fine Adjustment Key" and the coordinates $(X_a,Y_a)$ thereof are measured while the address $(a_x,a_y)$ of the frame α is displayed on the CRT 12 (Step S1). The address $(A_x,a_y)$ of the first projected frame α is input from the keyboard 15 while the frame address $(a_x,a_y)$ and the coordinate values $(X_a,Y_a)$ of the first frame α are stored in the memory 13 using the "Start Key" (not shown) (Step S2). Similarly, the second frame β is projected and accurately positioned at the center of the screen 7 using the "Fine Adjustment Key" and the coordinates $(X_b, Y_b)$ thereof are measured while the address $(b_x,b_y)$ of the frame β is displayed on the CRT 12 (Step S3). The address $(b_x,b_y)$ of the second projected frame β is input from the keyboard 15 while the frame address $(b_x,b_y)$ and the coordinates $(X_b,Y_b)$ of the second frame β are stored in the memory 13 using the "Start Key" (Step S4). Similarly, the third frame γ is projected and accurately positioned at the center of the screen 7 using the "Fine Adjustment Key" and the coordinates $(X_c,Y_c)$ thereof are measured while the address $(c_x,c_y)$ of the frame γ is displayed on the CRT 12 (Step S5). The address $(c_x,c_y)$ of the third frame γ is input from the keyboard 15 while the frame address $(c_x,c_y)$ and the coordinates $(X_c,Y_c)$ of the third frame γ are stored in the memory 13 using the "Start Key" (Step S6).

Since the row and the column addresses of the frames α, β, γ are different from each other, aforementioned reference pitches $A_x'$, $A_y'$ and reference corrections $\delta_x,\delta_y$ cannot directly be obtained. A frame β' (its address being $(b_x,a_y)$) whose column address is the same as that of the first frame α is assumed for the second address β, and a frame γ' (its address being $(a_x,c_y)$) whose row address is the same as that of the first frame α is assumed for the third frame in a manner to make the coordinate values thereof to be $(X_b', Y_b')$, $(X_c', Y_c')$, respectively. Displacements $l_x'$ and $l_y'$ between the two frames α and β' and between the two frames α and γ' and the deviation $\Delta_y'$ in the direction of the Y axis and the deviation $\Delta_x'$ in the direction of the X axis are calculated from the coordinate values thereof using the following formulas (7) and (8) (Step S7).

$$l_x' = X_b' - X_a \atop \Delta_y' = Y_b' - Y_a \quad (7)$$

$$l_y' = X_c' - X_a \atop \Delta_x' = Y_c' - Y_a \quad (8)$$

By the following formulas (9) and (10), the reference pitch $A_x'$ and the reference correction $\delta_y'$ are calculated using the displacement $l_x'$, deviation $\Delta_y'$ and number $(b_x - a_x)$ of frames along the row between the two frames $\alpha$ and $\beta$ while the reference pitch $A_y'$ and the reference correction $\delta_x'$ are calculated using the displacement $l_y'$, the deviation $\Delta_x'$ and the number $(c_x - a_x)$ of frames in the column between the two frames $\alpha$ and $\gamma$ (Step S8).

$$A_x' = l_x'/(b_x - a_x) \atop \delta_y' = \Delta_y'/(b_x - a_x) \quad (9)$$

$$A_y' = l_y'/(c_y - a_y) \atop \delta_x' = \Delta_x'/(c_y - a_y) \quad (10)$$

The coordinates $(X_b, Y_b)$ and $(X_c, Y_c)$ of the second frame $\beta$ and the third frame $\gamma$ can be expressed by the following formula (11) using the reference pitches $A_x'$, $A_y'$ and the reference corrections $\delta_x'$, $\delta_y'$ obtained from the coordinate values $(X_a, Y_a)$ of the first frame $\alpha$ and the formulas (7) through (10).

$$\begin{aligned} X_b &= X_a + (b_x - a_x) \cdot A_x' + (b_y - a_y) \cdot \delta_x' \\ Y_b &= Y_a + (b_y - a_y) \cdot A_y' + (b_x - a_x) \cdot \delta_y' \\ X_c &= X_a + (c_x - a_x) \cdot A_x' + (c_y - a_y) \cdot \delta_x' \\ Y_c &= Y_a + (c_y - a_y) \cdot A_y' + (c_x - a_x) \cdot \delta_y' \end{aligned} \quad (11)$$

From the above formula (11), the reference pitches $A_x'$, $A_y'$ and the reference corrections $\delta_x'$, $\delta_y'$ are calculated as in the formula (12), and are stored in the memory 13 (Step S8).

$$A_x' = \frac{(c_y - a_y) \cdot (X_b - X_a) - (b_y - a_y) \cdot (X_c - X_a)}{(c_y - a_y) \cdot (b_x - a_x) - (b_y - a_y) \cdot (c_x - a_x)} \quad (12)$$

$$A_y' = \frac{(c_x - a_x) \cdot (Y_b - Y_a) - (b_x - a_x) \cdot (Y_c - Y_a)}{(c_x - a_x) \cdot (b_y - a_y) - (b_x - a_x) \cdot (c_y - a_y)}$$

$$\delta_x' = \frac{(c_x - a_x) \cdot (X_b - X_a) - (b_x - a_x) \cdot (X_c - X_a)}{(c_x - a_x) \cdot (b_y - a_y) - (b_x - a_x) \cdot (c_x - a_x)}$$

$$\delta_y' = \frac{(c_y - a_y) \cdot (Y_b - Y_a) - (b_y - a_y) \cdot (Y_c - Y_a)}{(c_y - a_y) \cdot (b_x - a_x) - (b_y - a_y) \cdot (c_x - a_x)}$$

The coordinates $(X_O, Y_O)$ of the reference frame $P_O$ are calculated from the following formula (13) using the first frame $\alpha$ and the reference pitches $A_x'$, $A_y'$ and the reference corrections $\delta_x'$, $\delta_y'$ obtained from the formula (12), and are stored in the memory 13 (Step S9).

$$X_o = X_a - a_x \cdot A_x' - a_y \cdot \delta_x' \atop Y_o = Y_a - a_y \cdot A_y' - a_x \cdot \delta_y' \quad (13)$$

The coordinate value of reference frames, the reference pitches and the reference corrections necessary for positioning a frame are that obtained. When the frame address of the target frame, for example address (i,j) of the frame "Σ" as shown in FIG. 8, is input (Step S10), the coordinates $(X_i, Y_j)$ of the frame Σ can be calculated by the following formula (14) using the coordinates $(X_O, Y_O)$ of the reference frame $P_O$, the reference pitches $A_x'$, $A_y'$ and the reference corrections $\delta_x'$, $\delta_y'$ (Step S11).

$$X_i = X_o + i \cdot A_x' + j \cdot \delta_x' \atop Y_i = Y_o + j \cdot A_y' + i \cdot \delta_y' \quad (14)$$

According to the above method for positioning a frame, three arbitrary imaged frames on a microfiche are designated and the coordinate values thereof are measured as explained above. At the same time, a frame having the same row address as the first frame and a frame having the same column address as that of the first frame are assumed for the second and third frames respectively. The displacements $l_x'$ and $l_y'$ therebetween and the deviations $\Delta_x'$ and $\Delta_y'$ are measured, and the reference pitches $\delta_x'$ and $A_y'$ and the reference corrections $\delta_x'$ and $\delta_y'$ are obtained by dividing the above displacements and the deviation by the number of frames. If there is any error n the reference pitches $A_x'$ and $A_y'$ and the reference corrections $\delta_x'$ and $\delta_y'$ which will be the reference values for retrieving a frame, such error will be accumulated at the time of retrieval and the accurate position of the object frame becomes impossible. In order to minimize such an error, it is preferable to chose three frames which are as far apart as possible as the three arbitrary frames. Accumulation of errors in a frame can be avoided in this way, making the error extremely small to enable accurate positioning of any target frame. In addition, even if the type of the microfiche fluctuates or the dimension thereof may vary, the error will be too small to accumulate in each frame, enabling an accurate positioning of the object frame. By repeating the aforementioned steps S10 and S11, a predetermined frame is positioned correctly and properly and the data thereof is used as the positional correction data for each frame.

As stated in the foregoing in detail, if the position displayed on the screen is deviated from the frame images which has been positioned with correction by the correction equation due to the difference between individual machines, minute adjustment is conducted by means of a rotation key (not shown), and the correction data thereof is registered as a rotation correction value. The data should include the correction by 90° based on the horizontal/vertical records for each imaged frame.

The above positional data and the fiche-mode data may be registered in "32" bytes which can be broken down into "4" bytes for the X and Y axes each occupying 4 digits of the original point of the software coordinates or the reference frame position forming the position correction data, "6" bytes for X and Y in frame pitch data each occupying "6" digits, and "6" bytes for X and Y of the positional correction data each occupying "6" digits, totalling "16" bytes for the X and Y axes. They further include one byte for the format number indicating the format type of the microfiche, one byte for the feeding direction "3" bytes for rotation correction value, one byte for lens magnification, "4" bytes for security data and another "4" bytes for stand-by, totalling "16" bytes. This makes "1024" bytes for a cartridge which can house "32" fiches, and "1M" bytes for "999" cartridges.

As described in detail in the statement above, the automatic retrieval method of the present invention can correct and retrieve the position of frames by reading out the positional correction data and the fiche-mode data which are registered in advance to thereby enable fully automated operation in retrieval, copying and transmission at a high speed.

It should be understood that many modifications and adaptations of the invention will become apparent to those skilled in the art and it is intended to encompass such obvious modifications and changes in the scope of the claims appended hereto.

What is claimed is:

1. An automatic retrieval method in which a plurality of microfiches are sequentially and automatically retrieved, each of said microfiches having a plurality of frames which have been exposed with images and each of said plurality of frames having a different address, said method comprising the steps of:
   (a) selecting one microfiche from said plurality of microfiches;
   (b) selecting a frame of said selected microfiche;
   (c) calculating positioning data for aligning said selected frame based on the orientation of said selected frame on a retrieval device;
   (d) storing said calculated positioning data in a memory;
   (e) storing, in said memory, fiche-mode data defining at least one characteristic format of said selected microfiche;
   (f) performing steps (b)–(e) for each one of said plurality of frames on said selected microfiche;
   (g) performing steps (a)–(f) for each one of said plurality of microfiches;
   (h) reading out said calculated positioning data and said fiche-mode data from said memory when one of said plurality of microfiches is subsequently selected for retrieval;
   (i) positioning the subsequently selected frame in accordance with said read out data so that said subsequently selected frame is aligned on said retrieval device; and
   (j) repeating steps (h) and (i) for other frames to be retrieved.

2. An automatic retrieval method as claimed in claim 1 wherein the number of said plurality of frames is in the range of two to three.

3. An automatic retrieval method as claimed in claim 1 wherein said memory is provided on a housing containing said microfiches.

4. An automatic retrieval method as claimed in claim 3, wherein said memory is provided on a cartridge.

5. An automatic retrieval method as claimed in claim 3, wherein said housing is a fiche jacket.

6. An automatic retrieval method as claimed in claim 1 wherein said memory is incorporated in a controller.

7. An automatic retrieval method as claimed in claim 1 wherein said memory is a memory device of a data retrieval system other than a data retrieval system in which said automatic retrieval method is implemented.

8. An automatic retrieval method as claimed in claim 1 wherein said stored calculated positioning data is stored on one sheet of said microfiche.

9. An automatic retrieval method as claimed in claim 1, wherein said memory is incorporated in a device subordinate to a controller.

10. An automatic retrieval method as claimed in claim 1, wherein the frames of said microfiche are not arranged in parallel with the moving directions of said retrieval device.

11. An automatic retrieval method as claimed in claim 1, wherein said plurality of frames does not include a reference frame or a maximum address frame in the row or column of said reference frame.

12. An automatic retrieval method as claimed in claim 2, wherein a reference frame or a maximum address frame in the row or column of said reference frame has not been exposed.

13. A method as claimed in claim 1 wherein the positioning data includes at least one of a reference pitch and a reference correction.

14. A method as claimed in claim 1 wherein the microfiche has a feeding direction relative to said retrieval device, and
   wherein said calculated positioning data determines alignment of the microfiche with respect to the feeding direction.

* * * * *